July 28, 1959 C. M. SCHELL 2,896,312
REFRIGERATING APPARATUS
Filed Feb. 25, 1955
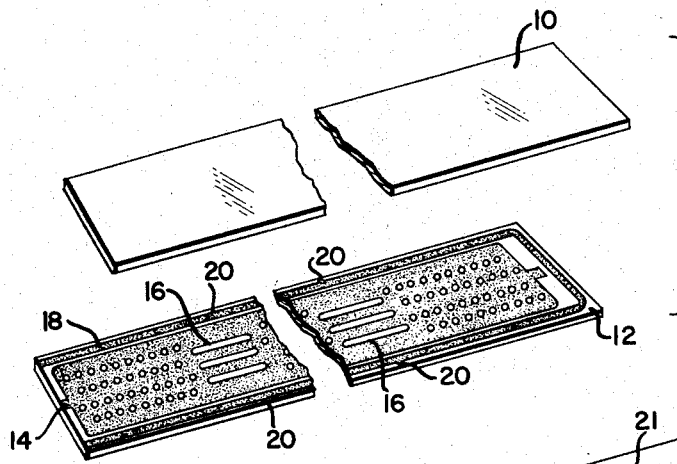
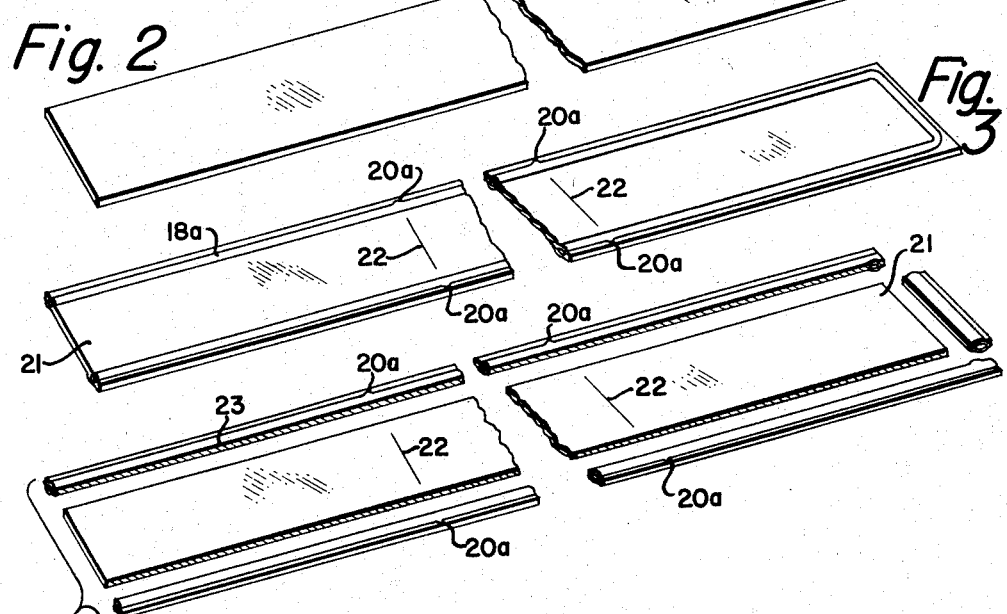
INVENTOR.
Carl M. Schell
BY R. R. Candor
His Attorney

2,896,312

REFRIGERATING APPARATUS

Carl M. Schell, Dayton, Ohio, assignor to General Motors Corporation, Detroit, Mich., a corporation of Delaware Application February 25, 1955, Serial No. 490,560

1 Claim. (Cl. 29—157.3)

This invention relates to refrigerating apparatus and more particularly to an improved heat exchanger and the method of making the same.

It has been found practical to manufacture both plate and tube type evaporators by the now well known roll forging process wherein two superimposed sheets of metal are forge welded together at their meeting faces at all points except where a vein of stop weld material has been provided between the sheets prior to the forge welding operation. The lack of uniformity in the extent of elongation of the metal sheets during the forge welding operation presents problems in subsequent trimming and bending operations which must be performed prior to dilating the internal passages. These problems are aggravated when making relatively long, narrow conduits of the type used in making serpentine-shaped heat exchangers wherein the return bend portions are dissimilar from the straight portions of the conduits.

It is an object of this invention to provide accurate means for detecting differences in the extent of elongation of the sheets so as to make it possible to locate the position of return bends and the like before the interior passages are dilated.

More particularly it is an object of this invention to provide a tracer pattern at the edge portion of the sheet adjacent the main pattern and to dilate the tracer pattern for the purpose of outlining and consequently locating the main pattern before the latter is dilated.

Further objects and advantages of the present invention will be apparent from the following description, reference being had to the accompanying drawings wherein a preferred embodiment of the present invention is clearly shown.

In the drawings:

Figure 1 is a perspective view showing a pair of metal strips having a pattern of stop weld material provided on the one strip.

Figure 2 is a perspective view showing the strips following the roll welding operation.

Figure 3 is a view similar to Figure 2 showing the strips after the tracer pattern has been dilated.

Figure 4 is a perspective view showing the resulting strip after the edges containing the tracr pattern have been cut away.

Figure 5 is a plane view showing the strip of Figure 4 placed in a serpentine cavity prior to dilation of the main passage.

For purposes of illustration, the drawings show the invention as applied to the manufacture of a serpentine type of heat exchanger whereas certain aspects of the invention are equally applicable to other types of sheet metal devices formed by the roll forging process. Reference numerals 10 and 12 designate two strips of metal for use in manufacturing a heat exchanger unit of serpentine shape. As indicated in Figure 1 of the drawing, the sheet 12 has a first pattern of stop weld material 14 applied to its one face. The pattern 14 will determine the configuration of the fluid passage to be formed between the sheets 10 and 12. The pattern of the stop weld material 14 at each return band is that shown at 16 and differs from the pattern for the straight portions of the finished serpentine tube.

A second pattern of stop weld material 18 is provided on the strip or sheet 12 and this pattern extends around the outer periphery of the sheet in that part of the sheet which would normally be cut away after the roll forging operation. This second pattern 18 serves as a tracer pattern for locating and outlining the main pattern 14. It will be noted that the pattern 18 includes nodes 20 directly opposite the return bend portions of the pattern 14 so as to locate the position of each return bend portion.

After the stop weld patterns 14 and 18 have been formed on the plate 12, the plate 10 is lowered onto the plate 12 and the two plates are then passed between heated rollers which reduce the thickness of the plates and cause them to become welded together at all places where there is no stop weld material between the plates. For a more complete description of the roll bonding process and the materials and equipment used, reference is hereby made to copending application No. 356,376, filed May 21, 1953, now Patent No. 2,845,695.

When the plates come out from the forging rollers, they form a composite strip 21 which is perfectly flat on both sides and without any indication as to the location of the interior passages. In making serpentine shaped heat exchangers, the interior passages are not formed or dilated until the bonded strip has been trimmed at the edges, bent into serpentine shape, and placed in a serpentine cavity 24 in a die such as die 26 shown in Figure 5. Since the strips do not elongate evenly and are perfectly flat it is impossible to determine the exact location of the return bend portions of the strips. By providing the tracer pattern 18 and dilating this pattern so as to form the tracer ridges 18a and nodes 20a corresponding to the tracer pattern as shown in Figure 3, it is possible to locate vital base points such as the return bend portions of the pattern along the length of the main pattern 14 without first dilating the pattern 14. These return bend locations 16 then can be marked in any suitable manner such as by a chalk line 22 on the surface of the strip 21. Once these have been marked, the edges of the strip which contain the tracer pattern can be cut away, as indicated in Figure 4. The strip is then bent into serpentine shape and placed in the serpentine cavity 24 in the die 26 shown in Figure 5. By knowing in advance the location of the various return bend portions of the pattern, it is possible to more intelligently bend the strip into serpentine shape. After the strip has been inserted into the forming die, the main passages are then dilated in accordance with now well known practice to form a serpentine fluid conduit.

While the embodiment of the present invention as herein disclosed, constitutes a preferred form, it is to be understood that other forms might be adopted.

What is claimed is as follows:

The process of forming a serpentine type of heat exchanger which comprises superimposing two strips of weldable material having therebetween a first pattern of stop weld material arranged in the general configuration of the desired main passageway to be formed including one type of configuration for the straight run portions of said heat exchanger and another type of configuration for the return bend portions and having a second locating pattern of stop weld material adjacent one edge of said strips and having a plurality of indicator portions arranged in a predetermined relationship to said return bend portions of said first pattern, roll forging said plates together to form a composite strip, dilating said plates throughout the area covered by said locating pattern so as to determine the location of said return bend portions before dilating said plates throughout said first pattern, placing marks adjacent said return bend portions on a part of one of said plates, removing the edge portions of said composite strip so as to remove said locating pattern without removing said marks, forming one or more bends in said composite strip in a predetermined relationship to said marks, placing the composite strip in a serpentine die cavity, and then dilating said main passageway while said strip is in said die cavity so as to limit the extent of dilation of said main passageway.

References Cited in the file of this patent

UNITED STATES PATENTS

| | | |
|---|---|---|
| 2,673,542 | Smith | Mar. 30, 1954 |
| 2,690,002 | Grenell | Sept. 28, 1954 |